United States Patent [19]

Land

[11] Patent Number: 4,896,132
[45] Date of Patent: Jan. 23, 1990

[54] FINGERPRINT DISPLAY APPARATUS

[76] Inventor: Larry D. Land, 1946 Edgerton, St. Paul, Minn. 55117

[21] Appl. No.: 245,047

[22] Filed: Sep. 6, 1988

[51] Int. Cl.$^4$ .............................................. G03B 21/26
[52] U.S. Cl. ........................................ 353/94; 353/101
[58] Field of Search ............... 353/94, 30, 34, 48, 353/101, 82; 356/391, 392, 393; 283/68-70

[56] References Cited

U.S. PATENT DOCUMENTS

| | | | |
|---|---|---|---|
| 3,376,782 | 4/1968 | Whitley et al. | 353/94 |
| 3,894,797 | 7/1975 | Barowski et al. | 353/30 |
| 4,458,993 | 7/1984 | Kempf | 353/54 X |
| 4,466,716 | 8/1984 | Kramer et al. | 353/94 |

FOREIGN PATENT DOCUMENTS

| | | | |
|---|---|---|---|
| 509308 | 10/1930 | Fed. Rep. of Germany | 356/393 |
| 708439 | 5/1954 | United Kingdom | 353/30 |

Primary Examiner—Harry N. Haroian
Attorney, Agent, or Firm—Douglas L. Tschida

[57] ABSTRACT

Multi-lens slide projection apparatus for displaying transparent fingerprint records in side-by-side and juxtaposed relation to one another. Each lens system is independently mounted on a gimbaled platform having externally accessible tilt and rotation control mechanisms for one or both platforms for varying the relative positions of each platform to the other to orient the projected images without skewing or paralax.

9 Claims, 6 Drawing Sheets

FINGERPRINT DISPLAY APPARATUS

BACKGROUND OF THE INVENTION

The present invention relates to fingerprint storage, comparison and display apparatus and, in particular, to an assembly for displaying in side-by-side and overlapped relation to one another a pair of fingerprints and whereby a match can be ascertained.

Over the years, the forensic sciences and judicial system have depended on fingerprint comparisons by way of circumstantially and demonstratively proving or disproving the guilt of a potential criminal. That is, upon matching certain indicia of a known fingerprint with those of an unknown fingerprint, it is possible with some certainty to link the fingerprints of a known party with latent prints found at a crime scene. Although in themselves not determinative of guilt or innocence, such evidence may circumstantially link with other evidence to prove/disprove the owner of a located set of prints.

As noted in Applicant's pending U.S. Pat. No. 4,669,753, historically fingerprints have been obtained by requiring a person to submit to an original duplication process wherein the fingertips are separately inked and brought into contact in a rolling motion with an opaque card to create a record thereof. Difficulties are however incurred in using and managing such cards with the potential duplication of entries under different aliases, among other possible duplications. Such cards are also rather tedious and awkward to work with for purposes of conducting a comparison and maintaining a viable recording system. That is, the paper card stock bearing the fingerprints over time tends to deteriorate, not to mention the problems of displaying the prints in an enlarged format. Although, an opaque projector might be used to enlarge and project images therefrom for comparison and demonstrative display, the clarity and resolution is not sufficient for many proceedings. Accordingly, Applicant's in his U.S. Pat. No. 4,669,753, provides not only a long-lived transparent/adhesive carrier storage media for maintaining a permanent record of such prints but also one from which high resolution copies might be made with comparable clarity and definition, even when enlarged.

One particular circumstance where print records of the foregoing type find particular advantage is in the study and projection of demonstrative evidence of a comparative match, such as is frequently desirable in courtroom proceedings. Although, individual slide reproductions can be made of each separate print which, in turn, can be displayed via a slide projector on a suitable screen, conventional slide projectors do not readily facilitate the juxtaposition of a pair of fingerprints in an overlay fashion.

Although, one may manually and separately adjust a pair of projectors to focus one on top of the other, this normally is effected only through a rather tedious and cumbersome set of adjustments which requires the tilting and rotating of one or both of the projectors. Accordingly, a need exists for an assembly whereby side-by-side and overlay comparisons can be made of prints of known and unknown origin.

SUMMARY OF THE INVENTION

It is accordingly a primary object of the invention to provide a multi-lens projection system for contrasting and comparing a pair of fingerprint containing slides.

It is a further object of the invention to provide a system wherein each lens system is independently gimbal mounted to facilitate a tilt and rotatable adjustment of each slide image.

It is a further object of the invention to include an externally accessible linkage assembly for affecting the necessary position adjustments of each lens system.

It is a yet further object of the invention to provide a third projection lens system for selectively overlaying a duplicate, known slide image on an unknown image and displaying the overlapped image in side-by-side relation to a duplicate of either the known or unknown slide image.

Various of the foregoing objects, advantages and distinctions are presently embodied in a preferred construction wherein each of a pair of projection lens are gimbal mounted in a single projector housing. Means are included whereby each lens may be focused and slides may be advanced manually or automatically. Each slide carrier supports a reproduction of a fingerprint on a transparent carrier relative to independent, illumination and cooling sources. Each lens is secured to an adjustable gimbal mounted platform and relative to which individual adjustment linkages extending from the projector housing are selectively operable to independently tilt and rotate each lens when adjusting the image position on a screen or when producing an overlay image.

In the latter regard, a simultaneous lateral adjuster assembly is disclosed which includes an end mounted worm gear which couples to an adjacent T-mounted mating geared shaft having threaded ends that connect to separately pivoting couplers at each platform. Rotation of the worm gear induces rotation of the threaded shaft within the pivotal couplers with a consequent extension/retraction of one corner of the platform. A simultaneous tilt adjustment assembly is also disclosed which includes a pair of yoke arms that contact each platform corner which corners are spring loaded from beneath. The extension/retraction of the arms relative to an intermediate coupler via a threaded stem raises/lowers each platform to tilt the supported lens.

The foregoing objects, advantages and distinctions of the invention, among others, as well as a detailed description of the presently preferred embodiment follows with respect to the appended drawings. Before referring thereto, it is to be appreciated the following description is made by way of the presently preferred embodiments only and should not be interpreted in limitation of the spirit and scope of the invention as claimed hereinafter. Rather only is it illustrative of one preferred embodiment, even though to the extent modifications and improvements have been considered, they are described as appropriate.

DESCRIPTION OF THE PREFERRED EMBODIMENT

Figure 1:
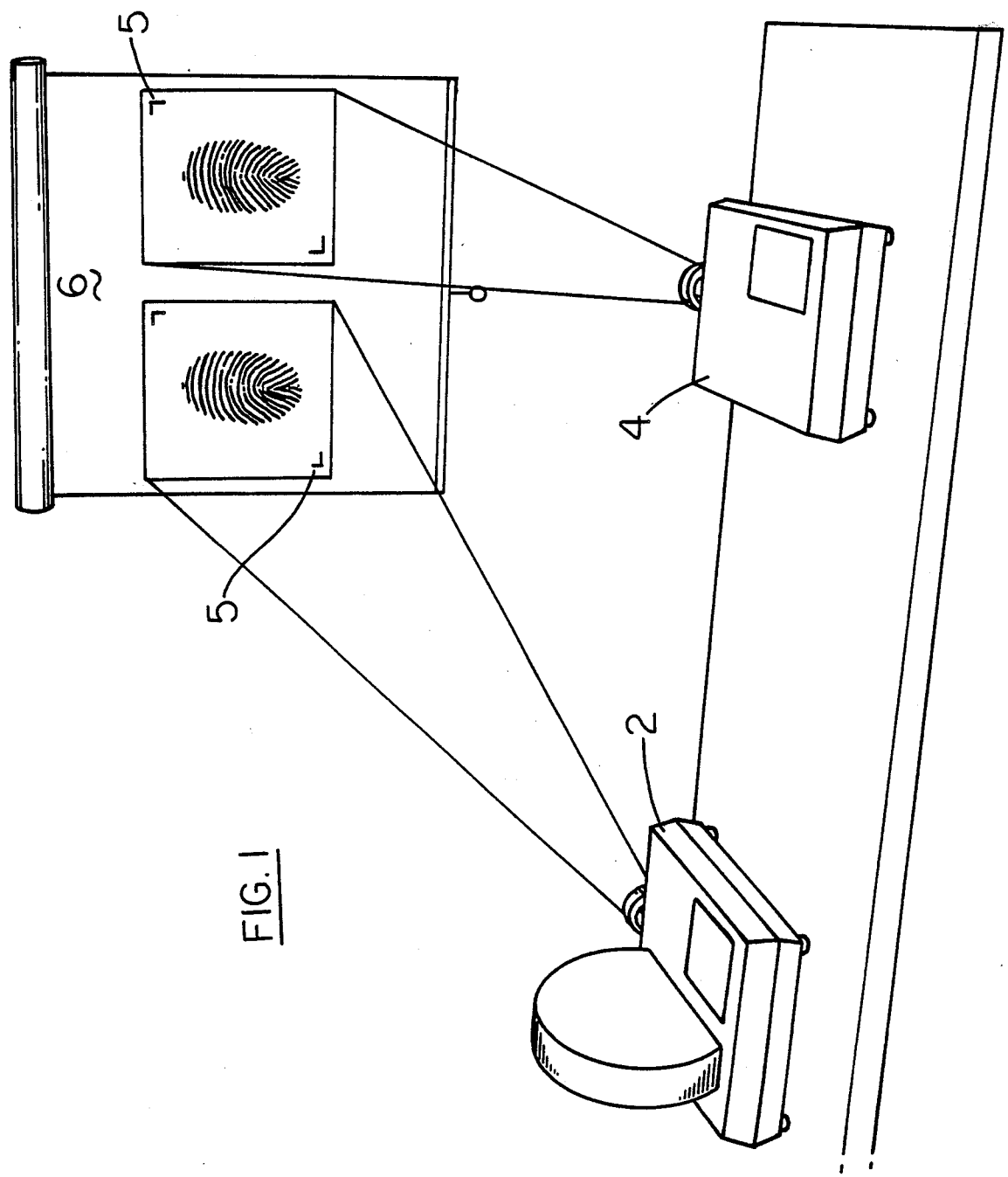
FIG. 1 shows a generalized conceptual view of the invention relative to a pair of conventional projectors.

Referring to FIG. 1, a conceptual diagram is shown of a pair of conventional slide projectors 2 and 4 which might be emploYed to project images of fingerprints onto a screen 6. In this instance, the fingerprints have been mounted on a slide format as by way of adhesive print tape and processes disclosed in Applicant's U.S Pat. No. 4,669,753. That is, the adhesive bound prints, as they are taken or reproductions thereof, are affixed to individual slide carriers having a transparent substance with index markings 5 mounted in the carrier window. Upon placing the prepared slides within the projector's optical viewing path, the recorded fingerprints are projectable onto the screen 6 and may be aligned relative to one another for comparative purposes.

Such a projection arrangement provides advantages over the prior art. It may also be used to overlap a pair of prints, one on top of the other. A better appreciation can be had thereby of the similarities in the indicia of the prints.

Although the slide images may be overlapped, to do so requires a rather tedious adjustment of each of the projectors 2 and 4 to assure proper horizontal and vertical alignment. One or both of the images must also be rotated slightly to compensate for paralax which occurs upon turning the projectors. In fact, when attempting to manually manipulate a pair of projectors to perform this task, it can take from five to fifteen minutes to obtain the proper adjustments which might also be lost with any intermediate jostling of the equipment, such as upon inserting an additional slide or a new set of slides. Accordingly, Applicant by way the embodiments of FIGS. 2 through 5 has conceived of an improved, multilens viewer construction including a plurality of adjustable lens supporting platforms which may be independently or concurrently adjusted to appropriately display a plurality of images relative to one another, which images may include an overlapped image.

Figure 2:
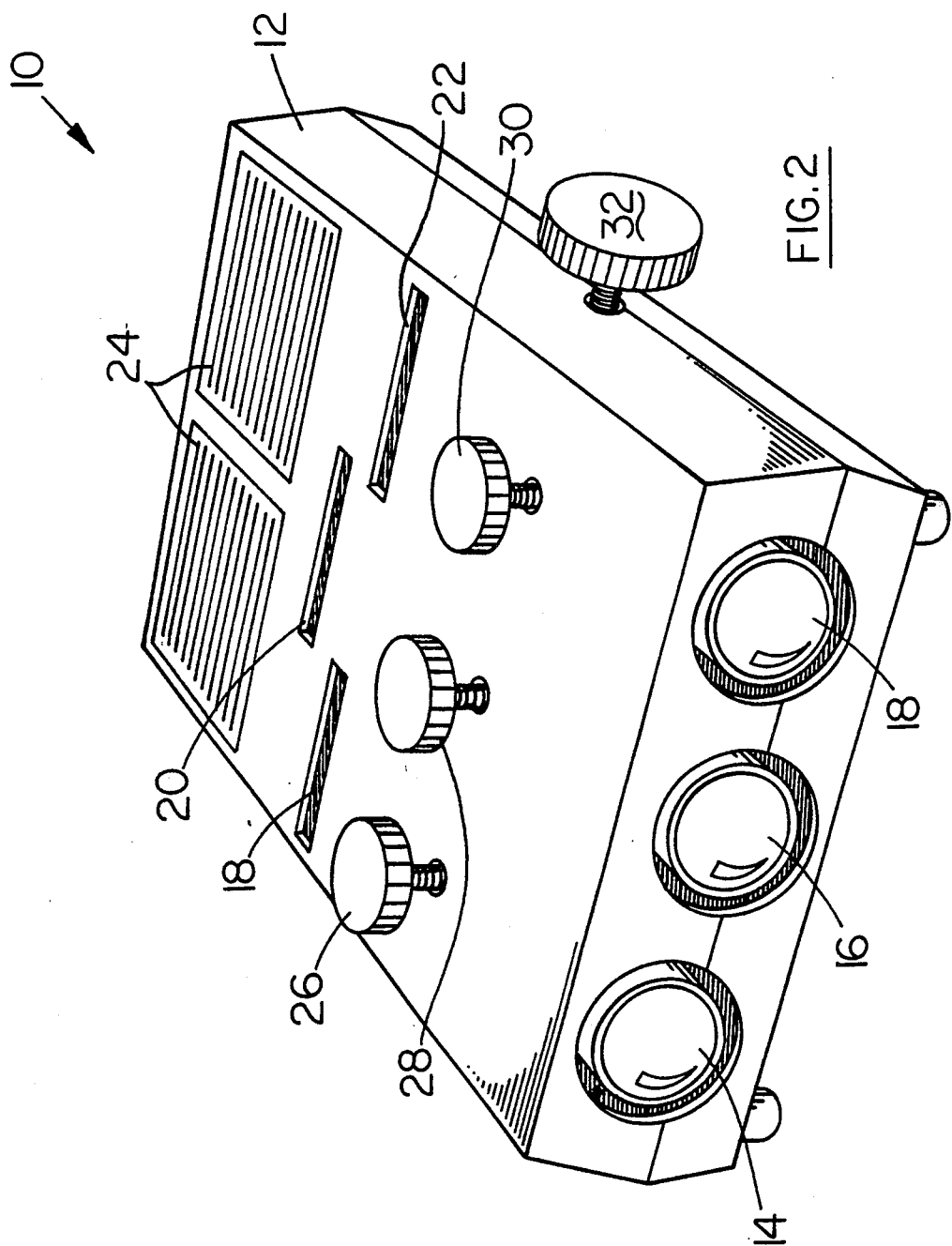
FIG. 2 shows an isometric view of the housing of a multi-lens fingerprint projector.

FIG. 2 particularly shows one such arrangement or viewer 10 contemplated by Applicant which comprises a molded housing 12 having three zoom adjustable lenses 14, 16 and 18 which are mounted interiorly of the enclosure 12. Provided on the outer surface of the enclosure are a number of slotted channels 18, 20 and 22 which permit the insertion of slides into the projection path of each of the lenses 14, 16 and 18. Although the channels are shown on the top of the housing 12, they may be positioned at the sides, depending upon the internal spacings relative to the necessary linkages. One or more illumination sources (not shown) project light through the slides and lenses 14, 16 and 18 to display the print images on the screen 6. One or more fans (not shown) mounted beneath the vents 24 distribute cooling air over the lenses 14, 16 and 18.

Otherwise, a plurality of top mounted knobs or hand wheels 26, 28 and 30 and side mounted hand wheels 32 (only one of which is shown) are provided for manually adjusting the relative projection orientation of each lens. That is, each lens 14, 16 and 18 is mounted on a separately gimbaled platform which is adjustable in at least a pair of planes (i.e. vertically and horizontally) to permit the physical adjustment of the image position.

Heretofore with conventional projectors such adjustments ar achieved only by a comparable adjusting of the support legs and/or rotating the projectors 2 and 4. In contrast to the embodiment of FIG. 1, however, the device of FIG. 2 more readily permits this adjustment by way of the knobs or hand wheels 26 through 32 which permit a much quicker and finer adjustment of each image. Moreover, the provision of a third lens allows the simultaneous display of a known print x and an unknown print y, in side-by-side relation to one another, while an identical image of one or the other is overlapped with the image of either the x or y print.

For the embodiment of FIG. 2, it is contemplated that individual slides are be manually inserted/removed from each lens, although it is to be appreciated that with modification various known carousel mechanisms such as shown for the projector 2 might be advantageously employed to perform this function. Moreover, the focus of each lens 14, 16 and 18 is presently adjusted by manually screwing each lens in or out of its carrier relative to the slide carrier and illumination source. Again, however, a variety of known screw-follower and/or other mechanical linkages might be coupled to each lens carrier to automatically adjust the focus of each.

Figure 3:
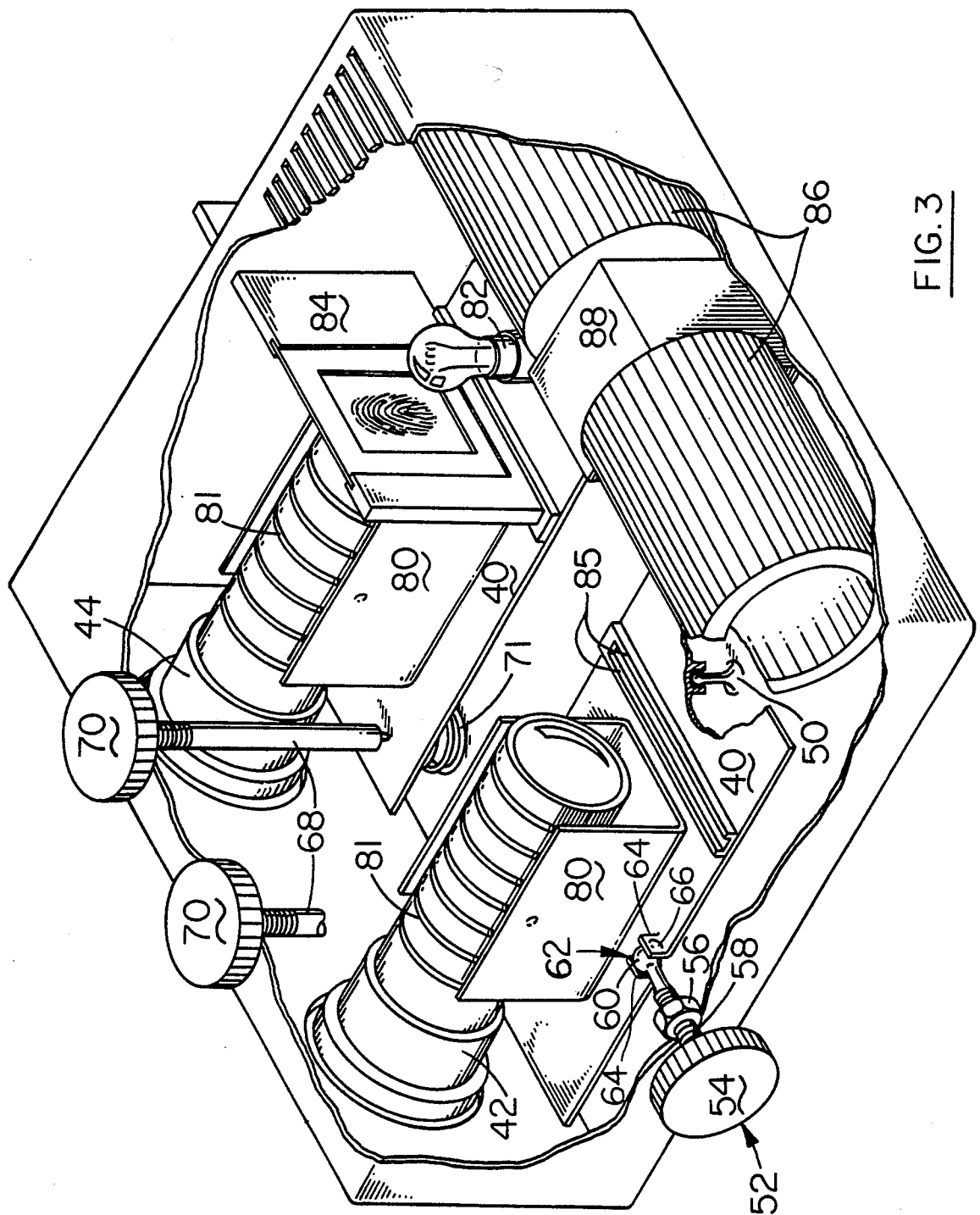
FIG. 3 shows an isometric view in exploded assembly of a pair of independent, gimbaled suspensions for a pair of independently adjustable projection lenses.
Figure 4:
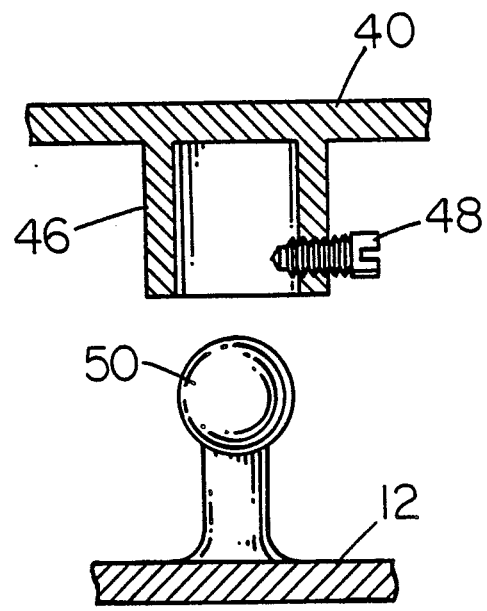
FIG. 4 shows an elevation view of the gimbal mounting of one of the lens support platforms.

Turning attention to FIGS. 3 and 4, an exploded assembly view is shown of a typical 2-lens device and the related adjustment mechanisms used therewith to adjust the gimbaled platforms 40 which support each lens 42 and 44. FIG. 4, in turn, shows a detailed view of the gimbal mounting. For this embodiment, a pair of generally flat platform members 40 are provided which include a collar 46 (reference FIG. 4) mounted beneath a lower surface having a set-screw restraint 48 for securing the collar 46 about a ball type joint member 50 extending upward from the enclosure bottom 12. The gimbal joint is offset rearward as shown in phantom for the left platform 40 from the center of the platform 40 to provide the necessary freedom of movement to align and overlap images on the screen 6. Similarly, each platform is also horizontally rotatable, although is not permitted to touch the housing 12 or adjacent platform.

Horizontal adjustment is particularly obtained by way a threaded screw-follower assemblies 52 mounted to the right and left enclosure sides (only the left side of which is shown). Each assembly 52 includes a hand wheel 54 mounted exteriorly of the enclosure 12 and a threaded nut 56 secured to the inner enclosure surface. A threaded stem 58 extends through the nut 56 and enclosure wall and is adjustable in or out by way of the hand wheel 54.

The extreme end of each threaded member 58 includes a ball shaped end 60 which mates with a U-shaped clevis 62 formed from a pair of tangs 64 bent up from the platform edge. Dimples 66 let in each tang receive the ball 60 and permit rotational movement should it be simultaneously tilted. Each platform thus tilts on an axis formed between the pivots of the ball 60 and the gimbal 50. Upon, however, screwing the stem 58 forward or backward, the platform 40 may be horizontally rotated to one side or the other.

Otherwise, the vertical adjustment of each platform 40 is achieved via a similarly configured threaded stem 68 having an end hand wheel 70 and welded nut (not shown) secured to the top of the enclosure 12. The extreme end of the stem 68 may or may not mount to the platform 40, but contacts an upper surface, preferably the corner. Mounted beneath each platform a the point of contact of the stem 68 is a spring 71 which biases the platform against the stem 68. As the stem 68 is screwed in or out, the platform is vertically raised/lowered. A concurrent horizontal adjustment at the adjusters 52 is permitted by allowing the stem 68 to slide along the top of the platform 40.

Each platform 40 also supports a U-shaped lens carrier 80 which resiliently, threadably receives the screw threads 81 of each lens 42 and 44. An illumination source 82 is (only one of which is shown) mounted to the rear of each lens 42,44 behind an intermediate slide carrier 84 which retractably extends into the enclosure 12 between a pair of track rail 85. Squirrel-cage fans 86 coupled to a single motor 88 again cool the lens system.

Although a pair of independent platform mounted illumination sources 82 are contemplated, a single enclosure mounted source might be provided so long as it casts sufficient light through the lens 42 and 44. Similarly, while the focus of each lens is adjusted by manually screwing it in or out, an automatic slide acting or rotary mechanism might be used. Moreover, in lieu of manual slide carriers 84, a carousel arrangement such as in the left projector 2 of FIG. 1 might be used.

Figure 5:
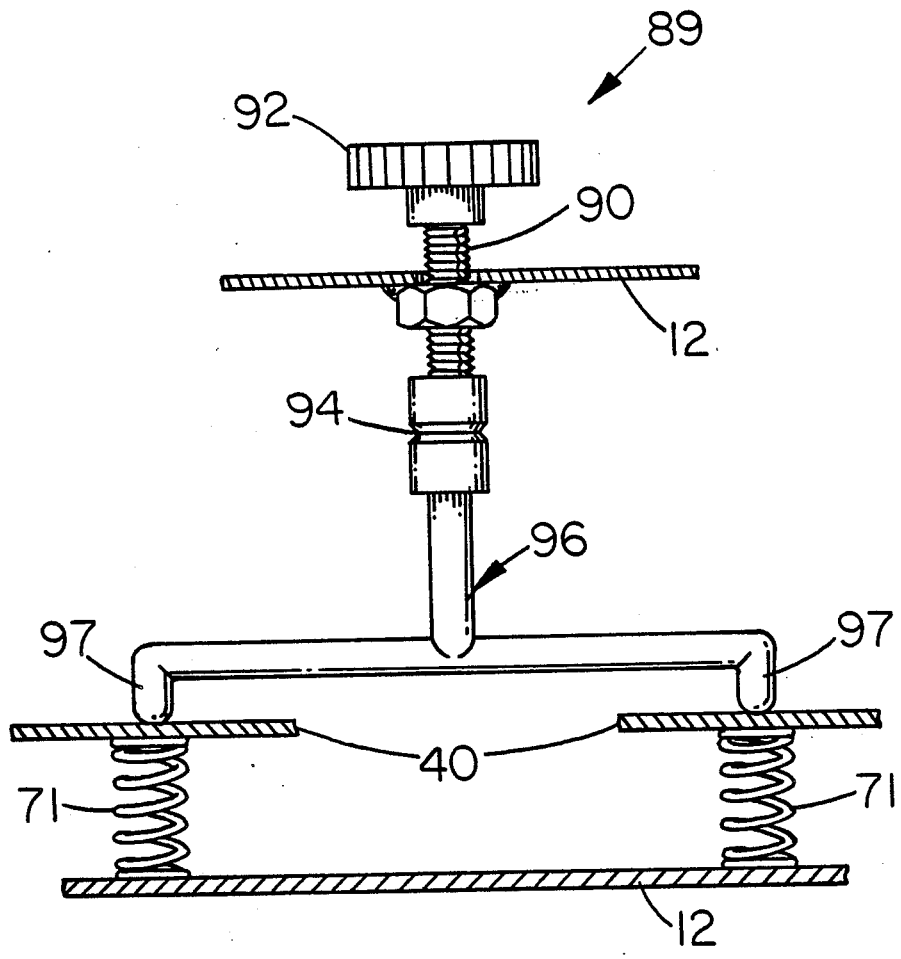
FIG. 5 shows a view of a yoked tilt adjuster linkage.

With attention next directed to FIG. 5, an isometric view is shown of an alternative vertical adjuster assembly 89 which is capable of simultaneously adjusting each of a pair of platforms 40. That is, a single stem 90, hand wheel 92 and intermediate slip coupler 94 vertically adjusts a pair of platforms 40 via a U-shaped yoke end 96. The extreme outer ends of each yoke arm 97, again, slidably contact the upper surfaces of each platform 40. Upon rotating the stem 90 relative to the slip coupler 94, the yoke arms 97 raise/lower the platforms 40.

Figure 6:
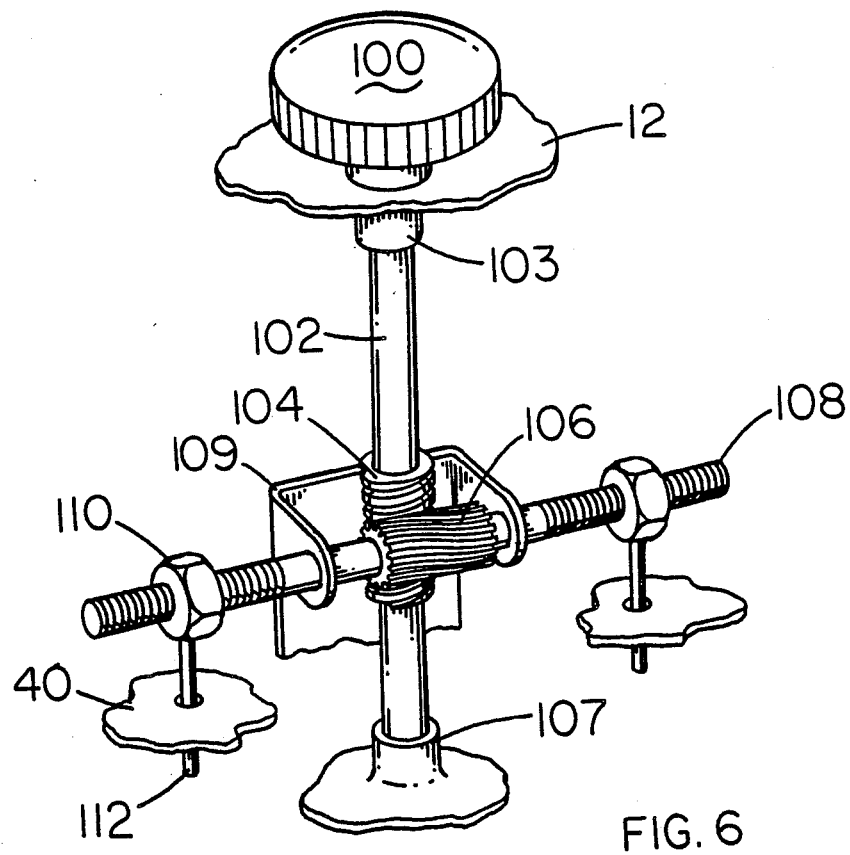
FIG. 6 shows a geared lateral adjustment linkage.

Turning attention lastly to FIG. 6, a view is shown of yet another adjustment mechanism which includes a hand wheel 100 supported stem 102 having an intermediate worm gear 104. The stem 102 is rotatively mounted at its upper end relative to the enclosure 12 within a bearing 103 and at its lower end in a socket 107 such that upon rotating the stem 102, the worm gear 104 engages a mating gear surface 106 of a shaft supported in a saddle bracket 109 in transverse relation to the gear 104. Secured in screw follower relation to the outer threaded ends of the shaft 108 are individual threaded collars or nuts 110 which include a pivot axle 112 which is mounted in a hole to the edge of each platform 40. As the shaft 108 rotates, the platforms 40 are drawn inward or outward, depending on the thread orientation of the shaft 108. The collar pivot axles 112 simultaneously permit a tilting of the platforms 40 with any necessary vertical adjustment. Thus, each of the platforms 40 can be simultaneously laterally adjusted as its tilt angle is adjusted.

The latter simultaneous adjustment mechanisms of FIGS. 5 and 6 find particular advantage in a three lens projector assembly such as in FIG. 3, where an overlapping adjustment is desired relative to at least two of the lenses. That is, a pair of such adjuster assemblies can be coupled to two of the lens supporting platforms 40 to simultaneously rotate each horizontally and vertically, until the images overlap, thereby reducing the overall adjustment time.

In such a projector, it is contemplated that individual, horizontal and vertical adjusters would be coupled to the third platform 40. Slide carousels could also be mounted to the two overlapping lenses. In this way, when presenting a comparison of a full set of prints, one might individually display each print with the single lens and then show a separate overlapped display of the same print with a known print without undue time loss. A presenter can thereby provide a detailed visual comparison of a pair of known and unknown prints, while elaborating on the comparison to a listening audience. Such a projector system clearly finds particular advantage in demonstrative presentations in the courtroom or elsewhere, which is not readily achievable with available equipment.

While the invention has been described with respect to its presently preferred and various alternative embodiments, it is to be appreciated still others might suggest themselves to those of skill in the art. Accordingly, it is contemplated that the following claims should be interpreted to include all those equivalent embodiments within the spirit and scope thereof.

What is claimed is:

1. Fingerprint display apparatus comprising:
   (a) first and second projection lenses respectively mounted to first and second separate support platforms and wherein each platform is supported from at least one pivot member interiorly of an enclosure;
   (b) means extending from said enclosure and coupled to each of said first and second platforms for horizontally rotating each platform relative to each platform pivot member; and
   (c) means extending from said enclosure and contacting each of said first and second platforms for vertically tilting each platform relative to each platform pivot member and relative to spring means for counter-biasing each of said first and second platforms;
   (d) first and second means for removeably supporting individual transparent carriers having a fingerprint pattern printed thereon in coaxial relation to said respective first and second lenses; and
   (e) means for back lighting each of said first and second lenses and said first and second fingerprint support means.

2. Apparatus as set forth in claim 1 wherein the horizontal rotation means comprises first and second threaded members mounted to respective mating first and second threaded members secured to said enclosure and each having a ball-shaped pivot member secured to a socket portion extending from one of said first and second platforms.

3. Apparatus as set forth in claim 1 wherein the horizontal rotation means includes a member having first and second threaded portions coupled to respective first and second threaded collars, and wherein each collar includes an axle extending through an aperture in one of said first and second platforms whereby each platform follows movement of said first and second collars along said first and second threaded portions.

4. Apparatus as set forth in claim 1 wherein said tilting means comprises a threaded member rotatively coupled to a mating collar member secured to said enclosure, a slip coupler secured between said threaded member and a first member having first and second portions contacting first and second surface portions of the respective first and second platforms and on opposite surface portions of each of which platforms a spring biases said first and second platforms into contact with said first and second portions such that upon extending-/retracting said threaded member each of said first and second platforms tilt relative to said pivot point.

5. Fingerprint display apparatus comprising:

(a) a plurality of projection lenses, wherein each lens is adjustably mounted in a single enclosure to separate gimbal mounted platforms, each platform having at least one pivot point and each including horizontal rotation means comprising a first threaded member length adjustably mounted to said enclosure and having an end-mounted pivot member pivotally secured to a U-shaped support extending from said platform and vertical tilting means comprising a second threaded member length adjustably mounted to said enclosure and including an inner end contacting a surface of said platform and on an opposite surface of which platform spring means bias said platform into contact with said inner end such that upon extending/retracting said second threaded member, said platform tilts relative to said pivot point, whereby each platform may be horizontally rotated and vertically tilted to direct the image projected from each lens;

(b) means for removeably supporting individual transparent carriers having a fingerprint pattern printed thereon in coaxial relation to each of said lenses;

(c) means for back lighting each of said lenses and said fingerprint support means; and (d) screen means for displaying the projected fingerprint images.

6. Apparatus as set forth in claim 5 wherein the outer end of said first threaded member includes a ball member captured between the sides of said U-shaped support.

7. Apparatus as set forth in claim 5 wherein at least one of said first and second threaded members includes means for simultaneously varying the position of at least one other platform as said first and second threaded member is rotated.

8. Fingerprint display apparatus comprising:
(a) first and second projection lenses each mounted to separate support platform and wherein each platform is supported from at least one pivot member interiorly of an enclosure;

(a) means coupled to each of said first and second platforms for horizontally rotating each platform relative to each platform pivot member;

(b) a first member rotatively mounted in nonextension relation to said enclosure and having a worm gear portion;

(c) a second member rotatively supported in nonextension parallel relation to said first and second platforms and including a geared poriton mating with said worm gear poriton; and (d) means for coupling said second member to each of said first and second platforms such that upon rotating said first member said first and second platforms are simultaneously rotated relative to the pivot member of each platform;

(e) first and second means for removeably supporting individual transparent carriers having a fingerprint pattern printed thereon in coaxial relation to said respective first and second lenses; and (f) means for back lighting each of said first and second lenses and said first and second fingerprint support means 9. Apparatus as set forth in claim 8 wherein opposite outer ends of said second member are threaded and each end mates with a threaded collar including an axle mounted to extend through an aperture in one of said first and second platforms.

* * * * *